US010895907B2

(12) United States Patent
Binder et al.

(10) Patent No.: US 10,895,907 B2
(45) Date of Patent: *Jan. 19, 2021

(54) IMAGE EDITING WITH AUDIO DATA

(71) Applicant: Google LLC, Mountain View, CA (US)

(72) Inventors: Thomas Binder, Lübeck (DE); Ronald Frank Wotzlaw, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/400,973

(22) Filed: May 1, 2019

(65) Prior Publication Data

US 2019/0317593 A1    Oct. 17, 2019

Related U.S. Application Data

(62) Division of application No. 14/811,749, filed on Jul. 28, 2015, now Pat. No. 10,282,057.

(Continued)

(51) Int. Cl.
*G06F 3/01* (2006.01)
*G06F 3/16* (2006.01)
(Continued)

(52) U.S. Cl.
CPC ............. *G06F 3/012* (2013.01); *G06F 3/013* (2013.01); *G06F 3/017* (2013.01);
(Continued)

(58) Field of Classification Search
CPC ...... G06F 3/04845; G06F 3/013; G06F 3/005; G06F 3/017; G06F 3/04815;
(Continued)

(56) References Cited

U.S. PATENT DOCUMENTS

| 7,499,859 | B2 * | 3/2009 | Lu ...................... H04N 21/4394 704/270 |
| 10,282,057 | B1 * | 5/2019 | Binder .................... G06F 3/017 |

(Continued)

OTHER PUBLICATIONS

Non-Final Office Action in U.S. Appl. No. 14/811,749, 12 pages, dated Jul. 12, 2018.

(Continued)

*Primary Examiner* — Maryam M Ipakchi
(74) *Attorney, Agent, or Firm* — Lisa Benado; IP Spring

(57) ABSTRACT

Image editing on a wearable device includes a system which obtains sensor data via the wearable device. The sensor data includes a representation of hand movement, head movement or voice command associated with a user. The system executes an application for editing an image based on the obtained sensor data. The system provides for display a list of image adjustment types associated with the application. The system selects an image adjustment type based on one or more of the hand movement, the head movement or the voice command. The system provides for display a prompt having options to adjust a property of the selected image adjustment type. The system selects one of the options included in the prompt. The system modifies an image based on the selected option. The system then provides the modified image for storage in a data structure of a memory unit in the wearable device.

14 Claims, 5 Drawing Sheets

Related U.S. Application Data

(60) Provisional application No. 62/030,502, filed on Jul. 29, 2014.

(51) Int. Cl.
*G06F 3/0484* (2013.01)
*G06F 3/0481* (2013.01)

(52) U.S. Cl.
CPC ...... *G06F 3/04815* (2013.01); *G06F 3/04847* (2013.01); *G06F 3/167* (2013.01)

(58) Field of Classification Search
CPC .. G06F 3/0482; G06F 3/0484; G06F 3/04847; G06F 40/12; G06F 40/166
See application file for complete search history.

(56) References Cited

U.S. PATENT DOCUMENTS

| | | | |
|---|---|---|---|
| 10,627,860 B2* | 4/2020 | Jacobsen | G05D 1/0038 |
| 2005/0177359 A1* | 8/2005 | Lu | H04N 21/4854 |
| | | | 704/200 |
| 2010/0110368 A1* | 5/2010 | Chaum | G02B 27/017 |
| | | | 351/158 |
| 2012/0147163 A1* | 6/2012 | Kaminsky | G09G 5/028 |
| | | | 348/62 |
| 2012/0249590 A1 | 10/2012 | Maciocci | |
| 2012/0287284 A1* | 11/2012 | Jacobsen | G06F 3/012 |
| | | | 348/158 |
| 2013/0055127 A1 | 2/2013 | Saito | |
| 2014/0043211 A1* | 2/2014 | Park | G02B 27/017 |
| | | | 345/8 |
| 2014/0125557 A1* | 5/2014 | Issayeva | G06F 3/04815 |
| | | | 345/8 |
| 2014/0192092 A1 | 7/2014 | Aruga | |
| 2014/0282069 A1 | 9/2014 | Canetti | |
| 2015/0002391 A1* | 1/2015 | Chen | H04N 5/23293 |
| | | | 345/156 |
| 2015/0149956 A1* | 5/2015 | Kempinski | G06F 3/0346 |
| | | | 715/784 |
| 2015/0160839 A1 | 6/2015 | Krishnaswamy | |
| 2015/0205358 A1 | 7/2015 | Lyren | |

OTHER PUBLICATIONS

Restriction Requirement in U.S. Appl. No. 14/811,749, 7 pages, dated Sep. 20, 2017.
Non-Final Office Action for U.S. Appl. No. 14/811,749, 15 pages, dated Dec. 6, 2017.
Non-Final Office Action for U.S. Appl. No. 14/811,749, 11 pages, dated Jul. 12, 2018.
Notice of Allowance in U.S. Appl. No. 14/811,749, 18 pages, dated Jan. 3, 2019.

* cited by examiner

IMAGE EDITING WITH AUDIO DATA

CROSS-REFERENCE TO RELATED APPLICATIONS

The present application is a divisional application of, and claims priority to, U.S. patent application Ser. No. 14/811,749, filed Jul. 28, 2015, entitled "Image Editing on a Wearable Device", which claims the benefit of U.S. Provisional Patent Application No. 62/030,502, filed Jul. 29, 2014, entitled "Method and System for Editing Images on a Head Wearable Device", the contents of which are hereby incorporated by reference in its entirety for all purposes.

BACKGROUND

A wearable computing device is intended to be worn on the body of a user, such as the user's head, and displays information in the form of images within a field of view of one user's eye, referred to as monocular wearable device, or within the field of view of each user's eye, referred to as binocular wearable device. Wearable display devices can provide a mobile platform to communicating, computing and interacting with a surrounding environment such that the wearable display devices may be applicable to a wide range of applications that augment a user's experience of the surrounding environment.

SUMMARY

The present description relates generally to wearable computing devices, and more particularly, but not exclusively, to image editing on wearable devices.

In an embodiment, a computer-implemented method includes obtaining image information by a sensor unit of a wearable device, the image information including a representation of a moveable object associated with a user. The method includes executing an application for editing an image by a processing unit of the wearable device, the application being executed based on the image information. The method includes providing for display, on a display unit of the wearable device, a list of image adjustment types associated with the application. The method includes selecting at least one image adjustment type of the list of image adjustment types based on a first position of the moveable object. The method includes providing for display, on the display unit. a prompt including levels of adjustment for the selected at least one image adjustment type. The method includes selecting a level of adjustment based on a second position of the moveable object. The method includes modifying an image using the selected level of adjustment. The method further includes providing the modified image for display on the display unit.

In another embodiment, a non-transitory machine-readable medium embodying instructions, which when executed by one or more processors, cause a computing device to perform operations. The operations include receiving, at a processor unit of a wearable device, first audio data from a sensor unit of the wearable device, in which the first audio data is associated with a user. The operations include providing for display, on a display unit of the wearable device, a user interface of an application for editing an image based on a first user input in the first audio data. The operations include providing for display, on the display unit via the user interface, a list of image adjustment types. The operations include selecting at least one image adjustment type of the list of adjustment types based on a second user input via the user interface. The operations include providing for display, on the display unit via the user interface, a prompt including levels of adjustment for the selected at least one image adjustment type, in which each of the levels of adjustment is displayed with a label corresponding to a level of adjustment. The operations include selecting a level of adjustment based on a third user input via the user interface. The operations include modifying an image based on the selected level of adjustment. The operations further include providing the modified image for display on the display unit.

In still another embodiment, an apparatus includes a display unit, one or more sensor units, one or more memory units and one or more processing units configured to execute executable instructions to perform operations. The operations include receiving, at the one or more processor units, first sensor data from the one or more sensor units, the first sensor data comprising first image information having a representation of a moveable object associated with a user. The operations include identifying one or more first movements by the object included in the first image information, in which the one or more first movements include one or more of a head movement by the user, a hand movement by the user or a gaze direction by the user. The operations include determining that the one or more first movements correspond to a first gesture associated with a first user input. The operations include providing for display, on the display unit, a user interface of an application for editing an image based on the first user input. The operations include providing for display, on the display unit via the user interface, a list of image adjustment types. The operations include determining a position of the first gesture relative to the list of image adjustment types. The operations include determining a match between a position of at least one image adjustment type of the list of adjustment types and the determined position of the first gesture. The operations include selecting the at least one image adjustment type based on the determined match. The operations include providing for display, on the display unit via the user interface, a prompt including a plurality of levels of adjustment for the selected at least one image adjustment type. The operations include receiving, at the one or more processor units, second sensor data from the one or more sensor units in response to the prompt provided for display, in which the second sensor data includes second image information relating to the moveable object. The operations include determining one or more second movements by the moveable object included in the second image information, in which the one or more second movements include one or more of the head movement or the hand movement by the user. The operations include determining that the one or more second movements correspond to a second gesture associated with a second user input. The operations include selecting a level of adjustment for the selected at least one image adjustment type based on the second user input. The operations include modifying an image based on the selected level of adjustment. The operations further include providing the modified image for display on the display unit.

The description in this summary section may provide some illustrative examples of the disclosure. This section is not intended to be a broad overview or to identify essential elements of the disclosure.

It is understood that other configurations of the subject technology will become readily apparent to those skilled in the art from the following detailed description, in which various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed implementations and together with the description serve to explain the principles of the disclosed implementations. In the drawings.

DETAILED DESCRIPTION

In the following detailed description, numerous specific details are set forth to provide a full understanding of the present disclosure. It will be apparent, however, to one ordinarily skilled in the art that implementations of the present disclosure may be practiced without some of these specific details. In other instances, well-known structures and techniques have not been shown in detail so as not to obscure the disclosure. Reference is made in the following detailed description to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Figure 1:
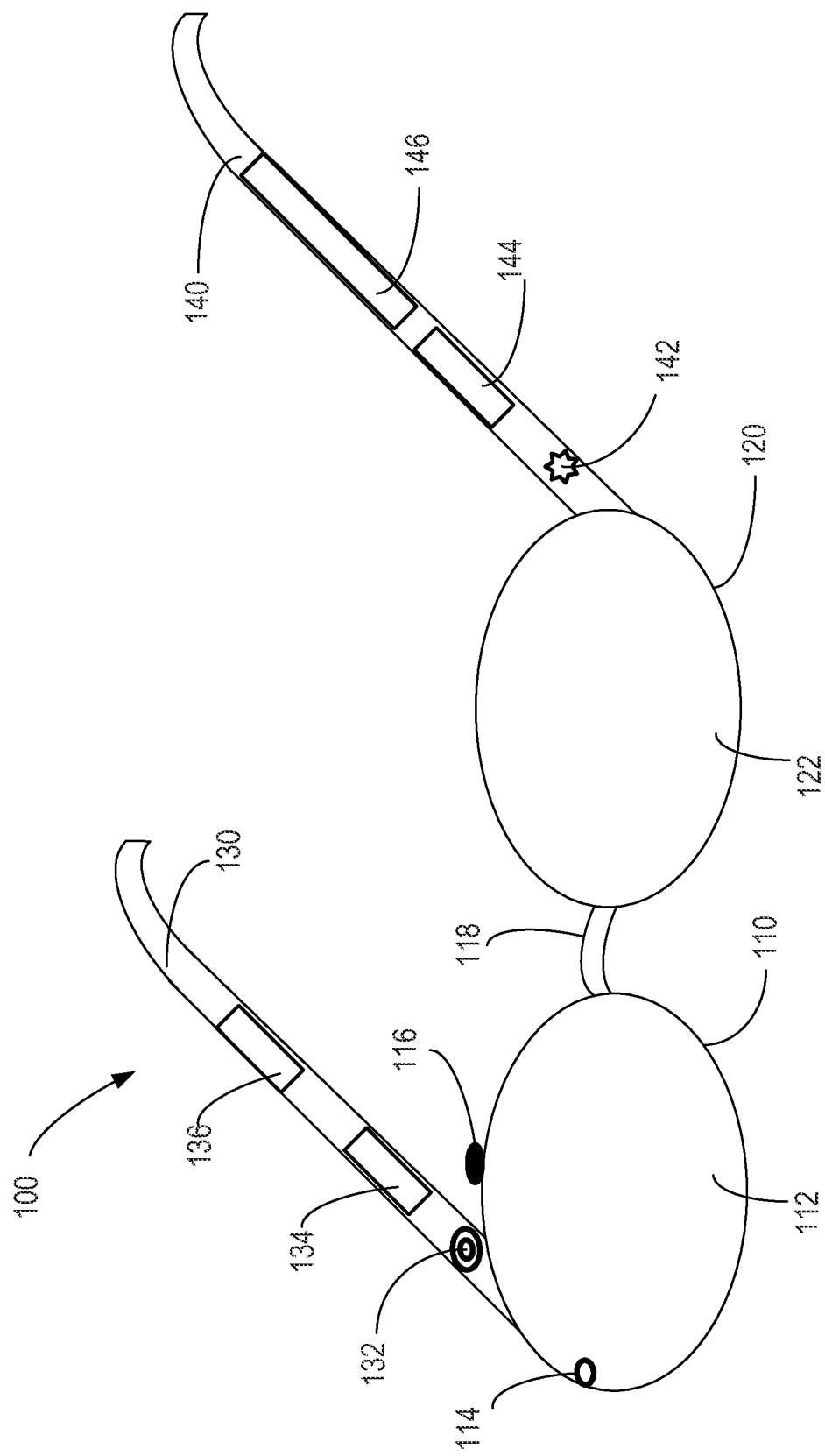
FIG. 1 illustrates an example wearable display device in which image editing may be implemented.

FIG. 1 illustrates an example wearable display device 100 in which image editing may be implemented. The wearable display device 100 integrates various elements, such as input devices, sensor devices, detector devices, display units, wireless communication devices as well as image and audio processors. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The wearable display device 100 is intended to be worn by a user including, but not exclusively to, the head of the user, a waist of the user, or any other member of the user's body. The wearable display device 100 includes a first frame 110 and a second frame 120, display units 112 and 122, a frame support structure 118, and frame stems 130 and 140. The wearable display device 100 also includes a first camera device 114 and a second camera device 116 on the first frame 110. The wearable display device 100 also includes motion sensor devices 134 and 136 and an image projection device 132 on the frame stem 130. The wearable display device 100 also includes a microphone device 142, an input device 144 and a computing device 146 on the frame stem 140. In some aspects, the wearable display device 100 is a multi-component device such that a first component is communicably coupled to a second component to facilitate transfer of data between the two components. For example, the first component may be worn on the user's head and the second component may be worn on the user's waist; however, the number of components and/or location of such components may vary depending on implementation.

The first camera 114 is coupled to an outer surface of the first frame 110 and is proximally located to the display unit 112. Similarly, the second camera 116 is coupled to an inner surface of the first frame 110 and is proximally located to the display unit 112. The first camera device 114, referred to as a field of view (FOV) camera, may be a camera that captures images and/or video within a FOV of the user wearing the wearable display device 100. The second camera device 116, referred to as facing an eye (FEY) camera, may be a camera that captures images and/or video of the user's eye. The first camera device 114 and the second camera device 116 may be charge-coupled device (CCD) cameras or complementary metaloxide-semiconductor (CMOS) cameras, depending on implementation. As known to one of ordinary skill in the art, some CCD and CMOS cameras typically use the same kind of vision element, namely a photo diode.

The display units 112 and 112 are referred to as separate displays in some embodiments, or referred to as a common display in other embodiments. The display units 112 and 122 are housed within the first and second frames 110 and 120, respectively. The display units 112 and 122, referred to as lenses, may provide for display images and/or video to the user. The images and/or video may be displayed within the FOV of the user. Example display units 112, 122 include display devices, such as a LED (light emitting diode) screens or LCD (liquid crystal display) screens, for displaying information to the user. The images and/or video for display on the display units 112 and 122 originate from the computing device 146 in some embodiments, or originate from an external source communicably coupled to the wearable display device 100 in other embodiments.

The image projection device 132 is coupled to an inner surface of the frame stem 130 and is proximally located to the display unit 112. The image projection device 132 may project a display onto an inner surface of the display unit 112. In some aspects, the display units 112, 122 include a region with an opaque reflective surface for displaying images projected by the image projection device 132.

The motion sensor devices 134 and 136 are housed within the frame stem 130. The motion sensor device 134 may be an accelerometer for measuring linear acceleration of the wearable display device 100, and the motion sensor device 136 may be a gyroscope for measuring linear and/or rotational movements by the wearable display device 100. In some aspects, the motion sensor devices 134 and 136 may be micro-sized piezoelectric sensors. In other aspects, the motion sensor devices 134 and 136 may be micro-electrical-mechanical system (MEMS) sensors. Each of the motion sensor devices 134 and 136 maybe a single component, or may include more than one component.

The wearable display device 100 may be secured onto a user's face by the frame support structure 118 coupled between the first and second frames 110 and 120, which are coupled to the frame stems 130 and 140, respectively. The wearable display device 100 may be formed as a solid structure composed of bulk material, including but not limited to, one or more of plastic, metal, ceramic, or glass. The wearable display device 100 may be formed as a hollow structure composed of the bulk material or variation thereof to allow wiring and component interconnections to be internally routed through the wearable display device 100. Each of the frame stems 130 and 140 is an example of a projection that extends away from a display (e.g., display units 112 and 122) and is used to secure the display to the user.

The computing device 146 may include one or more processor units (not shown) and one or more memory units (not shown). In one or more implementations, the computing device 146 is integrated into one of the frame stems 130 and 140 of the wearable display device 100. In some aspects, the computing device 146 may communicate with an external computing device mounted to a headgear such as a hat or a helmet, referred to as a head-mounted computing device, or mounted to a member of the user such as an arm, leg or waist of the user, referred to as a body-mounted computing device.

The computing device 146 may be operably coupled to the first camera device 114, the second camera device 116, the motion sensor devices 134 and 136, the microphone device 142, and the image projection device 132. The computing device 146 may receive and process input sensor data from one or more of the first camera device 114, the second camera device 116, the motion sensor devices 134 and 136, and the microphone device 142 in order to send image data to the image projection device 132 for display on at least the display unit 112. The input device 144 may be a touch pad for the user to send one or more inputs to the computing device 146. The microphone device 142 is coupled to a surface of the frame stem 140 and is proximally located to the display unit 122. The microphone device 142 may be housed within the frame stem 140 such that a portion of the microphone device 142 is exposed on a surface of the frame stem 140. The input device 144 may be housed within the frame stem 140 and may include one or more input ports on a surface of the frame stem 140 for accepting user input via an external device. The computing device 146 is housed within the frame stem 140.

By way of example and without limitation, the wearable display device 100 may include a magnetometer and another orientation sensor device (e.g., a theodolite). The magnetometer may measure the Earth's magnetic field, which combined with a gravity measurement by the motion sensor device 136, can be used to determine an orientation of the wearable display device 100 in two- or three-dimensions. The theodolite can be a multi-function viewfinder that combines a compass, a two-axis inclinometer, and a rangefinder into one application.

During operation, the computing device 146 may monitor hand gesture data provided by the first camera device 114, eye movement data provided by the second camera device 116, head movement data provided by the motion sensor devices 134 and 136, and audio data provided by the microphone device 142 to modify images displayed on the inner surface of the display unit 112 as intended by the user.

The editing of digital image content or video content on the wearable display device 100 may be difficult because conventional editing elements such as a mouse or a touchscreen are unavailable on such wearable computing devices. In this regard, there is a need for a control scheme or method that enables a user to 1) edit images directly after they have been captured with the wearable display device 100, 2) edit images taken by a camera external to the wearable display device 100, or 3) edit images downloaded by the wearable display device 100. This may be the case for users who need to concentrate on more than one task at a time in a professional environment and the like, such as a pilot, a medical surgeon, or a bird photographer out in the wilderness. There also may be time-sensitive situations that rule out the possibility of an upload of the captured images to a network, such as a cloud network, and editing the uploaded images on a different computing device.

In accordance with the present disclosure, editing images on the wearable display device 100 can be performed by one or more hand gestures, by one or more head gestures, by audible voice commands, and by one or more eye movements. Accordingly, the wearable display device 100 is equipped with one or more cameras that can record hand gestures, with one or more gyroscopes/accelerometers that sense head gestures and/or head movements, with one or more voice capture units that detect voice commands, and with one or more eye gazing cameras that capture images of eye movements by the person wearing the wearable display device 100, thereby enhancing the user experience of editing images via the wearable display device 100.

In one or more implementations, hand gestures are detected to provide user input to the wearable display device 100 to edit images. The wearable display device 100, which includes the display units 112 and 122 and the first camera device 114, may recognize predetermined hand gestures and carry out editing actions in response. A predetermined hand gesture, such as a basic hand posture, may be used for activating an image editing user interface. For example, an index finger of one hand may be elongated (the remaining fingers being bent or closed) and positioned within a field of view of the first camera device 114. With the hand in the basic hand posture, detecting the index finger moving up and down corresponds to a user input that enables a selection of a type of image adjustment. The selection may be made from a displayed list-like menu of image adjustments containing, for example, contrast, brightness, saturation adjustments to the image, or other parameter values of filtration suitable for the image. In some aspects, the image adjustments include changing the location of the light source. For example, the light source within the image may be adjusted from a bottom-right corner to an upper-left corner in the image. In addition, detecting the user's hand movement and/or the index finger movement to the left and/or right corresponds to an input to adjust the strength of the selected adjustment. In one embodiment, finishing the adjustment, e.g., disabling the image editing user interface, can be accomplished by changing the hand posture, for example, by closing the hand or opening the hand entirely.

In one or more implementations, head gestures are detected to provide user input to the wearable display device 100 to edit images. The wearable display device 100, which includes the display units 112 and 122 and the second camera device 116, may recognize predetermined head gestures and carry out editing actions in response. A predetermined head gesture, such as a basic head tilt, may be used for activating the image editing user interface. For example, a sequence of the user's head raising and lowering may correspond to a user input to activate the interface. In some aspects, a movement of the user's head in a vertical direction may select a corresponding type of adjustment from the list-like menu described above. If one of the adjustments is selected, detection of the user's head moving in a leftward direction may decrease the strength of the adjustment, whereas detecting the user's head moving in a rightward direction may increase the strength of the adjustment. In some embodiments, the adjustment sequence may terminate (e.g., disabling the image editing user interface) in response to detecting the user's head tilting toward a detectable angle such as to the left or to the right.

In one or more implementations, voice commands/inputs are detected to provide user input to the wearable display device 100 to edit images. The wearable display device 100, which includes the display units 112 and 122 and a voice/audio detecting unit associated with the microphone device 142, may recognize predetermined voice commands and carry out editing actions in response. In some aspects, the predetermined voice commands may be detected as a sequence of words, phrases and/or statements. For example, a sequence of voice commands may include a first statement such as "start image editing," followed by a second statement such as "select adjustment" and then followed by one of "contrast", "brightness", and "saturation" statements as choices for selecting a type of image adjustment. Subsequently, for changing the strength of the selected image adjustment, a corresponding voice command may include the phrase "adjust strength" followed by the word "more" or "less," or in the alternative, a corresponding numerical value. In some aspects, the image adjustment may be terminated by detecting the word "stop" or a statement such as "stop editing." The foregoing phrases and corresponding words are merely examples, and other words, phrases or statements may be used to represent the predetermined voice commands.

In one or more implementations, eye movements are detected to provide user input to the wearable display device 100 to edit images. The wearable display device 100, which includes the display units 112 and 122 and the second camera device 116 may recognize predetermined eye movements and carry out editing actions in response. A predetermined eye movement, such as a forward-looking eye gaze for a predetermined period of time, may be used for activating the image editing user interface. Alternatively, a sequence of shifting by the user's eye in a left-to-right direction or a right-to-left direction may be interpreted to activate the image editing user interface. In some aspects, an image adjustment is triggered by a detection of a gazing of the eye on a specific location of the list-like menu containing the contrast, brightness, and saturation adjustments. Once the image adjustment is selected, detecting the user's eye moving in a leftward direction may decrease the strength of the image adjustment, whereas detecting the user's eye moving in a rightward direction may increase the strength of the image adjustment. The image adjustment may be terminated by detecting the user's eye closing a corresponding eyelid.

Figure 2:
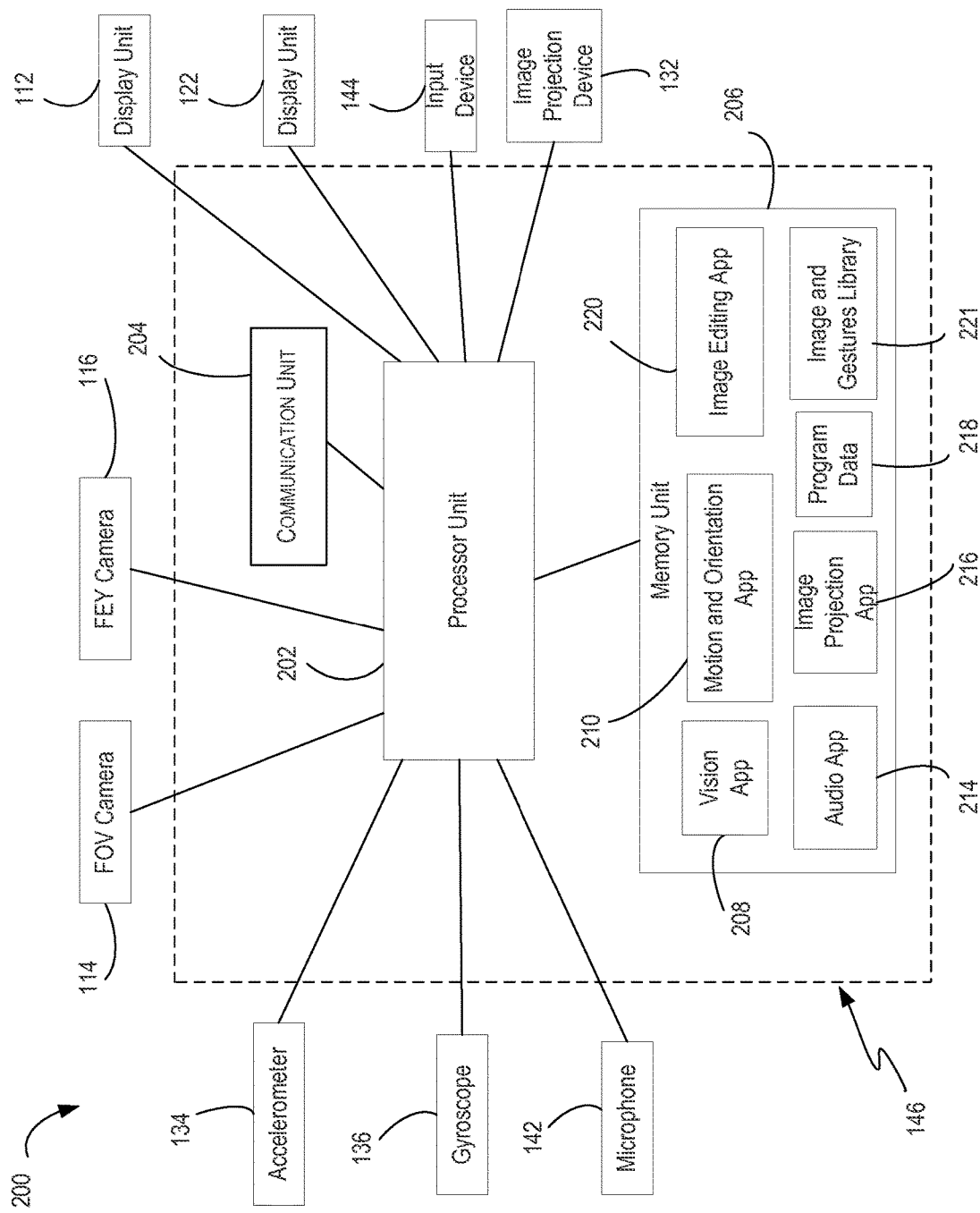
FIG. 2 is a block diagram illustrating an example computer system with which some implementations of the subject technology can be implemented.

FIG. 2 is a block diagram illustrating an example computer system 200 with which some implementations of the subject technology can be implemented. In certain aspects, the computer system 200 may be implemented using hardware or a combination of software and hardware, either in a dedicated computing device, or integrated into another entity, or distributed across multiple entities.

The computer system 200 includes the display unit 112, the display unit 122, the first camera device 114, referred to as the FOV camera, the second camera device 116, referred to as the FEY camera, the image projection device 132, the motion sensor device 134, referred to as the accelerometer, the motion sensor device 136, referred to as the gyroscope, the microphone device 142, the input device 144 and the computing device 146.

The computing device 146 includes a processor unit 202, a communication unit 204 and a memory unit 206. The first camera device 114, the second camera device 116, the image projection device 132, the motion sensor device 134, the motion sensor device 136, the microphone device 142 and the input device 144 are coupled to the computing device 146, which are thus operatively connected to the processor unit 202, which in turn are operably coupled to or integral with the memory unit 206.

The computer system 200 may include a bus (not shown) or other communication mechanism for communicating information, and a processor (e.g., the processor unit 202) coupled with the bus for processing information. By way of example, the computer system 200 may be implemented with one or more processor units 202. The processor unit 202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 200 can include, in addition to hardware, code that creates an execution environment for the computer program in question, e.g., code that constitutes processor firmware, a protocol stack, a database management system, an operating system, or a combination of one or more of them stored in an included memory (e.g., the memory unit 206), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to the bus for storing information and instructions to be executed by the processor unit 202. The processor unit 202 and the memory unit 206 can be supplemented by, or incorporated in, special purpose logic circuitry.

In one or more implementations, the memory unit 206 stores information and instructions executable by the processor unit 202 or other processor units and/or applications associated with the memory unit 206. The instructions may be stored in the memory unit 206 and implemented in one or more computer program products, i.e., one or more modules of computer program instructions encoded on a computer readable medium for execution by, or to control the operation of, the computer system 200, and according to any method well known to those of skill in the art, including, but not limited to, computer languages such as data-oriented languages (e.g., SQL, dBase), system languages (e.g., C, Objective-C, C++, Assembly), architectural languages (e.g., Java, NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages. iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. The memory unit 206 may also be used for storing temporary variable or other intermediate information during execution of instructions to be executed by the processor unit 202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

According to one aspect of the present disclosure, the wearable display device 100 can be implemented using a computer system 200 in response to the processor unit 202 executing one or more sequences of one or more instructions contained in the memory unit 206. Execution of the sequences of instructions contained in the memory unit 206 causes the processor unit 202 to perform the process steps described herein. One or more processors in a multi-processing arrangement may also be employed to execute the sequences of instructions contained in the memory unit 206. In alternative aspects, hard-wired circuitry may be used in place of or in combination with software instructions to implement various aspects of the present disclosure. Thus, aspects of the present disclosure are not limited to any specific combination of hardware circuitry and software.

The term "machine-readable storage medium" or "computer readable medium" as used herein refers to any medium or media that participates in providing instructions or data to the processor unit 202 for execution. Such a medium may take many forms, including, but not limited to, non-volatile media, volatile media, and transmission media. Non-volatile media include, for example, optical disks, magnetic disks, or solid-state memory such as flash memory. Volatile media include dynamic memory, such as the memory unit 206. Transmission media include copper wire including the wires that include the bus. The machine-readable storage medium can be a machine-readable storage device, a machine-readable storage substrate, a memory device, a composition of matter effecting a machine-readable propagated signal, or a combination of one or more of them.

In one or more implementations, the wearable display device 100 communicates via a wireless connection (e.g., electromagnetic radiation, infrared radiation or other wireless technology), a wired connection using any type of wire-based communication protocol (e.g., serial transmissions, parallel transmissions, packet-based data communications), or a combination of one or more wireless connections and one or more wired connections. Example communications modules (e.g., the communication unit 204) include one or more radio circuits and/or transceiver circuits (e.g., transmitter/receiver circuits).

The input device 144 may be used to make selections with respect to a graphical user interface (GUI) on the display units 112 and 122 (FIG. 1). The input device 144 may also be used to issue commands to processor unit 202. Multiple kinds of input devices 144 can be used to provide for interaction with a user, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. In some aspects, the input device 144 includes a touch sensing element for receiving input from a user's touch and sending the received input to the processor unit 202. The touch sensing element may be a touchpad, which may recognize touch points, in terms of coordinates of their positions as well as their magnitudes on a corresponding touch sensitive surface. The touch sensing element may be based on sensing technologies including but not limited to capacitive sensing, resistive sensing, surface acoustic wave sensing, pressure sensing, optical sensing, and/or the like. Additionally, the touch sensing element may be configured to detect a single touch point or a plurality of simultaneous touch points. The input device 144 may report data corresponding to the touch points to the processor unit 202, which interprets the reported data such that the processor unit 202 may initiate a task in accordance with a particular touch. In other aspects, the input device 144 includes a proximity sensing element for receiving input when the user's finger is within a predetermined distance from a surface of the proximity sensing element, and sending the received input to the processor unit 202.

The memory unit 206 includes a vision sensing data application 208, a motion sensing and orientation sensing data application 210, an audio sensing data application 214, an image projection application 216, program data 218, an image editing application 220, and an image and gestures library 221. The memory unit 206 may include, but not limited to, nonvolatile memory, such as read-only memory (ROM, flash memory, etc.), and volatile memory, such as random-access memory (RAM), or the like.

The vision sensing data application 208 activates and deactivates the first camera device 114 and the second camera device 116. The vision sensing data application 208 may convert digital image signals, generated by the first camera device 114 and/or the second camera device 116, into image input data which is communicated to the processor unit 202.

The motion sensing and orientation sensing application 210 activates and deactivates the motion sensor devices 134 and 136. The motion sensing and orientation sensing data application 210 may convert analog and/or digital signals, generated by the motion sensor devices 134 and 136, into motion and orientation input data which is communicated to the processor unit 202.

The audio sensing data application 214 activates and deactivates the microphone device 142, and may convert generated audio signals into audio input data which is communicated to the processor unit 202. The image projection application 216 activates and deactivates the image projection device 132, and may convert image data, from the processor unit 202, into image input data which is communicated to the image projection device 132.

In one or more implementations, the applications 208, 210, 214, 216 and 220 can operate with the program data 218 on a suitable operating system. Operating systems are generally well known and will not be described in greater detail. By way of example, the suitable operating system may correspond to mobile device operating systems. The suitable operating system can also be a special purpose operating system, such as may be used for limited purpose appliance-type computing devices.

As stated above, hand gestures can be used to provide user inputs to the wearable display device 100 to edit an image displayed on a display unit (e.g., the display units 112, 122) of the wearable display device 100. More specifically, a hand gesture can serve as a user interface of the wearable display device 100, providing functionality to trigger the image editing application 220 and/or to perform particular editing actions in response. In some aspects, other gestures may be interpreted as a user input to the wearable display device 100 to edit an image displayed on a display unit, such as detecting more than one hand waving in a particular pattern within the FOV of the first camera device 114 and/or second camera device 116, detecting the user's hand moving away from the wearable display device 100 relative to the first camera device 114 and/or second camera device 116, detecting the user's hand moving in and out of the FOV of the first camera device 114 and/or second camera device 116 that collectively form a particular gesture, detecting one or more discontinuous movements of the user's hand (e.g., stationary positions (or non-movements) serving as gaps in time between detected movements) that collectively form a particular gesture, and the like.

In some aspects, the three specific hand gestures may respectively correspond to 1) enabling the image editing user interface and selecting one of the three types of image adjustment, 2) adjusting the strength of the selected adjustment type and 3) ending the image adjustment. In some aspects, a fourth hand gesture may be used selecting a particular area of the displayed image to be adjusted. The three specific hand gestures may include 1) an elongated (or expanded) index finger of a user's hand in combination with all remaining fingers bent or closed (e.g., a fist with extended index finger to act as a cursor-like pointer gesture, 2) a fully closed hand (e.g., all fingers closed), and 3) a fully opened hand (e.g., all fingers expanded).

In some implementations, the wearable display device 100 can recognize that a hand gesture is being or has been made, and may then identify or match the recognized hand gesture against an image and gestures library 221 (or other list or collection of gesture items) of known hand gestures in order to determine one or more actions to take or invoke in response to the identified gesture. Thus, the user can interact (e.g., provide input data and/or commands) with the wearable display device 100 by performing or making a hand gesture in a region of space viewable by the first camera device 114. As such, the viewable region of space for hand gestures of a user can be a forward-looking FOV of the wearable display device 100, within about an arm's length from the front (forward-facing side) of the wearable display device 100. The characterization of "an arm's length" in front of the wearable display device 100 provides a useful example of a hand gesture space or region, but is not intended to limit the possible region of space around the wearable display device 100, in which hand gestures for interaction with the wearable display device 100 can be used.

In other aspects, the first camera device 114 monitors the FOV for one or more triggering hand gestures or criteria. For example, the first camera device 114 may monitor the FOV for a particular marker, such as a ring bearing a known pattern, which may then be used to signal the presence of a user's hand within a spatial region designated for hand gestures. As another example, the first camera device 114 may monitor the FOV for the appearance of a moveable object or item having a color or tone that matches or resembles one or more catalogued colors and/or tones considered to be representative of a variety of skin colors. Again, this may indicate the presence of a user's hand within a spatial region designated for hand gestures. It will be appreciated that other criteria or events may signal the presence of a user's hand, and trigger hand gesture analysis.

Upon determining that a triggering event has occurred, image data and/or video data from the first camera device 114 may be analyzed for the presence and/or occurrence of a hand gesture. Considering a static hand gesture for purposes of illustration, the wearable display device 100 may capture image data and/or video data from the field of view of the first camera device 114, and then identify a triggering gesture in the captured data. The processor unit 202 may then apply an analytical shape template to the triggering gesture or to a region containing the triggering gesture. More particularly, the analytical shape template may correspond to an adjustable graphical outline that can be algorithmically configured to fit around an identifiable form of the triggering gesture. Once a sufficient fit to the form of the gesture is obtained, the adjusted analytical shape template may then be used as a placeholder or proxy for the triggering gesture in a search for a match or near match against known/stored shapes in the image and gestures library 221 (or other list or collection) of known hand gestures. Accordingly, interaction with the wearable display device 100 via hand gestures can be facilitated by creating and maintaining a library of hand gestures, referred to as the image and gestures library 221, in the memory unit 206.

In some aspects, a search for a matching (or nearly matching) shape may be carried out by comparing an analytical expression for the adjusted shape template with each of an analytically-expressed shape in the image and gestures library 221, in which each known hand gesture is associated with a respective, analytically-expressed shape. Each comparison may take the form of a least-squares fitting procedure, for example, in order to identify a closest match. Other fitting procedures may be used as well. The search may test for a best match against known shapes in the image and gestures library 221. Alternatively, the search may proceed sequentially and terminate upon a first occurrence of a match that exceeds a threshold statistical significance, for example. Once a match (or a best-fit match) is found, the hand gesture can then be considered as recognized (or detected) by the wearable display device 100, and an associated action or actions are carried out.

By way of example, the image and gestures library 221 may be stored in the memory unit 206, and accessed by the processor unit 202 as part of the search for a matching shape. Each known shape, such as a predetermined hand gesture, in the image and gestures library 221 may be stored with a corresponding gesture identifier (e.g., a name or description), as well as indicia of one or more actions, programs, or applications that may be carried out or invoked upon matching the known shape against a received, adjusted, analyzed shape template of an observed (or detected) hand gesture. In operation, the adjustment of the shape template to an observed hand gesture, as well as the fitting procedure and the search for a match, may be implemented as one or more programs or applications, and executed by the processor unit 202.

The image and gestures library 221 may include a collection of such records, each containing a different hand gesture and associated analytically-expressed shape. The image and gestures library 221 may be composed of a collection of such data structure records. Upon determining an adjusted, analytical shape template of an observed (or detected) hand gesture, the processor unit 202 may perform a table look-up or other form of search in the image and gestures library 221 to identify a closest match with one of the stored analytically-expressed shapes. In this respect, the observed hand gesture may be identified with a known, stored gesture identifier. The identified hand gesture may, in turn, be used to signal or trigger an associated action or application on the wearable display device 100, for example.

In one or more implementations, the image and gestures library 221 may be created by generating each hand gesture through "learning" or recording processes. More particularly, the wearable display device 100 may be placed into a recording mode during which a given, initially-undefined (or unassigned) hand gesture is made within a viewable region of space used for hand gestures. 'The given hand gesture may then be recorded in the form of an analytically-expressed shape. In some aspects an associated gesture identifier as well as associated actions may be assigned to the analytically-expressed shape. The wearable display device 100 may then exit the recording mode. The newly-recorded hand gesture may be stored as an entry in the gesture library. This process may be repeated to increase the inventory of hand gestures in the image and gestures library 221. Thereafter, the recorded hand gestures may be available for interaction as described above. Additionally or alternatively, all or part of the image and gestures library 221 may be created externally to the wearable display device 100, and pre-loaded during system configuration or manufacture of the wearable display device 100, for example.

In some aspects, the image and gestures library 221 may include at least one alerting hand gesture, the purpose of which can be to signal (or notify) the wearable display device 100 to monitor for, or be "on the look-out" for, one or more subsequent, other hand gestures. The image and gestures library 221 may include more than one alerting hand gesture, each having a different, specific purpose or function, such as adjusting contrast, brightness, or saturation, for example.

The alerting hand gesture may be used, for example, to place the wearable display device 100 in a mode or state in which the wearable display device 100 may expect one or more subsequent hand gestures. As a further example, an alerting hand gesture may be used by the user of the wearable display device 100 to indicate that the wearable display device 100 is observing the user's hand or hands, thereby helping avoid possible confusion with images of someone else's hands that may be captured by the wearable display device 100. Additionally or alternatively, an alerting hand gesture may support an authorization and/or authentication function, in which the image editing operation may utilize detection of the alerting hand gesture before the wearable display device 100 captures images or video of any subsequent hand gestures. For example, a user of the wearable display device 100 may lock and unlock access to a hand gesture function of the wearable display device 100 with an alerting hand gesture that included an authorization and/or authentication function.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 3:
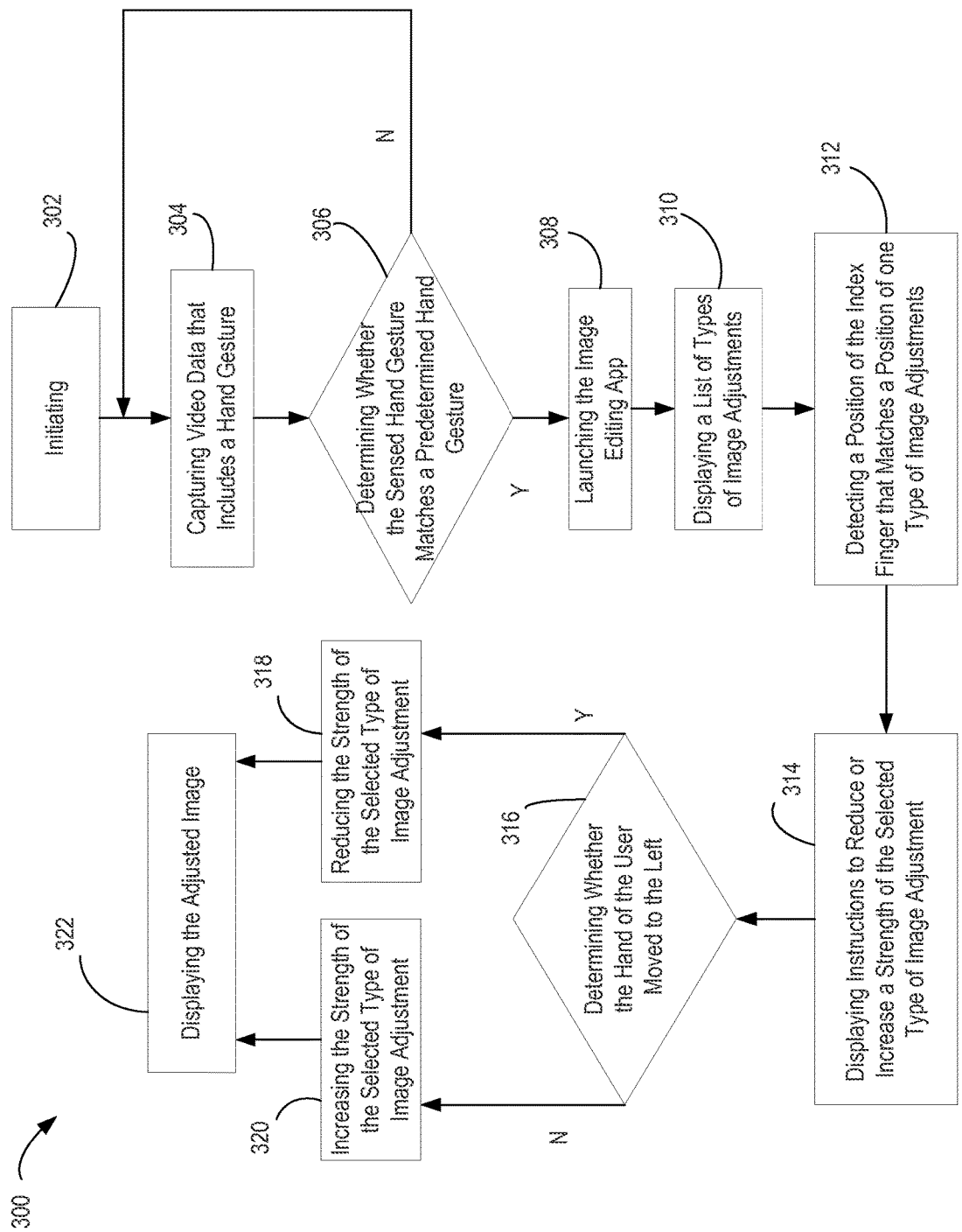
FIG. 3 illustrates an example process for image editing using hand gestures detected by the wearable display device of FIG. 1 according to certain aspects of the disclosure

FIG. 3 illustrates a flowchart of an example process 300 for image editing using hand gestures detected by the wearable display device of FIG. 1 according to certain aspects of the disclosure. The process 300 may be performed using, for example, the wearable display device 100 of FIG. 1, particularly, the processor unit 202 of FIG. 2. While FIG. 3 is described with reference to FIG. 2, it should be noted that the process blocks of FIG. 3 may be performed by other systems. FIG. 3 illustrates the blocks in the example process 300 as shown; however, it is understood that in other implementations of the example process 300, the blocks may appear in different order and blocks may be added or subtracted.

Once a user triggers (or initiates) a display of an image on a display unit (e.g., the display units 112 and 122) of the wearable display device 100 (302), the processor unit 202 activates the first camera device 114 (e.g., the FOV camera) and the vision sensing data application 208 to capture image data and/or video data, which may include a representation of a hand gesture by the user (304). Upon authorization by the user, the processing of any captured image data may be initiated and performed by the processor unit 302.

Upon capture of image data by the first camera device 114 within an arm's length from the wearable display device 100, the vision sensing data application 208 determines whether the captured image data includes an identifiable hand gesture that triggers an editing process of the displayed image (306). In this embodiment, the vision sensing data application 208 compares a stored triggering hand gesture, which includes an extended index finger for example, to the identifiable hand gesture in the captured image data.

Once the processor unit 202 determines that the captured hand gesture matches or nearly matches the stored triggering hand gesture, the processor unit 202 triggers a launching of the image editing application 220 (308). If the processor unit 202 determines that the captured hand gesture does not match or nearly match the stored hand gesture, then the process returns to the step of capturing image data and/or video data of a hand gesture by the user at block 304.

Subsequently, the processor unit 202 provides for display on the display unit a menu list that includes a number of types of image adjustments (310). The processor unit 202 also may instruct the user to move his or her extended index finger at a position with respect to the first camera device 114 that matches a position of a desirable type of image adjustment (312). For example, the user may hover his or her index finger within the FOV of the first camera device 114 such that the position of the index finger corresponds to the position of a level of adjustment within the menu, thereby selecting that level of adjustment. In some aspects, the image data includes a sequence of hand gesture movements such that the amount of change from the start of the sequence to the end of the sequence translates into a sequence of image adjustments at a rate of change corresponding substantially to a rate of change of the hand gesture movements. For example, if the sequence of hand gesture movements includes a hand gesture moving from left to right at a relatively high rate, then the sequence of image adjustments may transition between the levels of adjustment at a relatively high rate as well.

Upon detection of a position of the index finger, via the first camera device 114, that matches that of the desirable type of adjustment, the processor unit 202 instructs the user to move his or her hand or index finger to the left or to the right so as to reduce or increase, respectively, a strength of the selected type of adjustment (314). Upon determination of a movement of the hand or index finger to the left (316), via the first camera device 114, the image editing application 220 reduces the strength of the selected type of image adjustment (318). Alternatively, the image editing application 220 increases the strength of the selected type of image adjustment (320), when the hand or index finger is determined to move to the right (316).

In one or more implementations, the image editing application 220 enables the user to select a portion of the image to be modified. For example, the image editing application 220 may prompt the user to select a coordinate and/or a quadrant, for example, on the image to be modified by the selected type of adjustment as well as by the level of adjustment selected. In some aspects, the image editing application 220 may prompt the user in addition to the prompt associated with the list of adjustment types such that separate image information including a representation of the user's selection of the image portion would be provided for processing by the processor unit 202.

In some aspects, the image editing application 220 provides an action, via the processor unit 202, to have the modified image displayed on a display unit to allow the user to confirm the adjustment made to the image. The image may be displayed on the display unit 112 when the image is modified by the one or more levels of image adjustment type in real-time. In one or more implementations, the image editing application 220 causes the image to be modified by an external processor unit (e.g., a datacenter or a cloud-based repository). In this respect, the image editing application 220 sends with the image the selected type of image adjustment including the selected level of adjustment for the file type of image adjustment. In turn, the image editing application 220 receives the image modified with the requested image adjustments by the external processor unit. In a case where the image is modified by an external processor unit, the user may confirm the adjustment made to the image or request one or more additional changes to be made by sending a further request to the external processor unit with the requested additional changes. The image may be stored in the memory unit prior to being transmitted to the external processor unit in some embodiments, or sent directly to the external processor unit after being captured by the sensor device in other embodiments.

In some aspects, the processor unit 202 provides for display the modified image on a display unit (e.g., the display units 112, 122) during the image adjustments in real-time, or after the image has been modified (322). Upon completion of the image editing operation, the processor unit 202 stores the modified image in the image and gestures library 221. Alternatively, the processor unit 202 provides for transmission the modified image to an external repository (e.g., a cloud-based database) for storage of the modified image. In some aspects, the processor unit 202 causes the activity of the image editing application 220 to terminate after storage of the modified image. Alternatively, the processor unit 202 may further provide for display an inquiry as to whether the user requests to pursue another image adjustment of the same image or of another image.

As used herein, the term "position" may refer to motion information and position information respectively including absolute location coordinates and relative location coordinates. The location coordinates may correspond to a location in a three-dimensional space (e.g., x-axis, y-axis, z-axis). The motion information may describe linear and/or rotational movement within the three-dimensional space such that a range of absolute location coordinates (including start and end coordinates) of a moveable object are described. The motion information may describe the moveable object relative to a different device or object other than the wearable display device. The position information may describe a stationary location of the moveable object within the three-dimensional space, including coordinate information of the moveable object relative to a different device or object other than the wearable display device.

Figure 4:
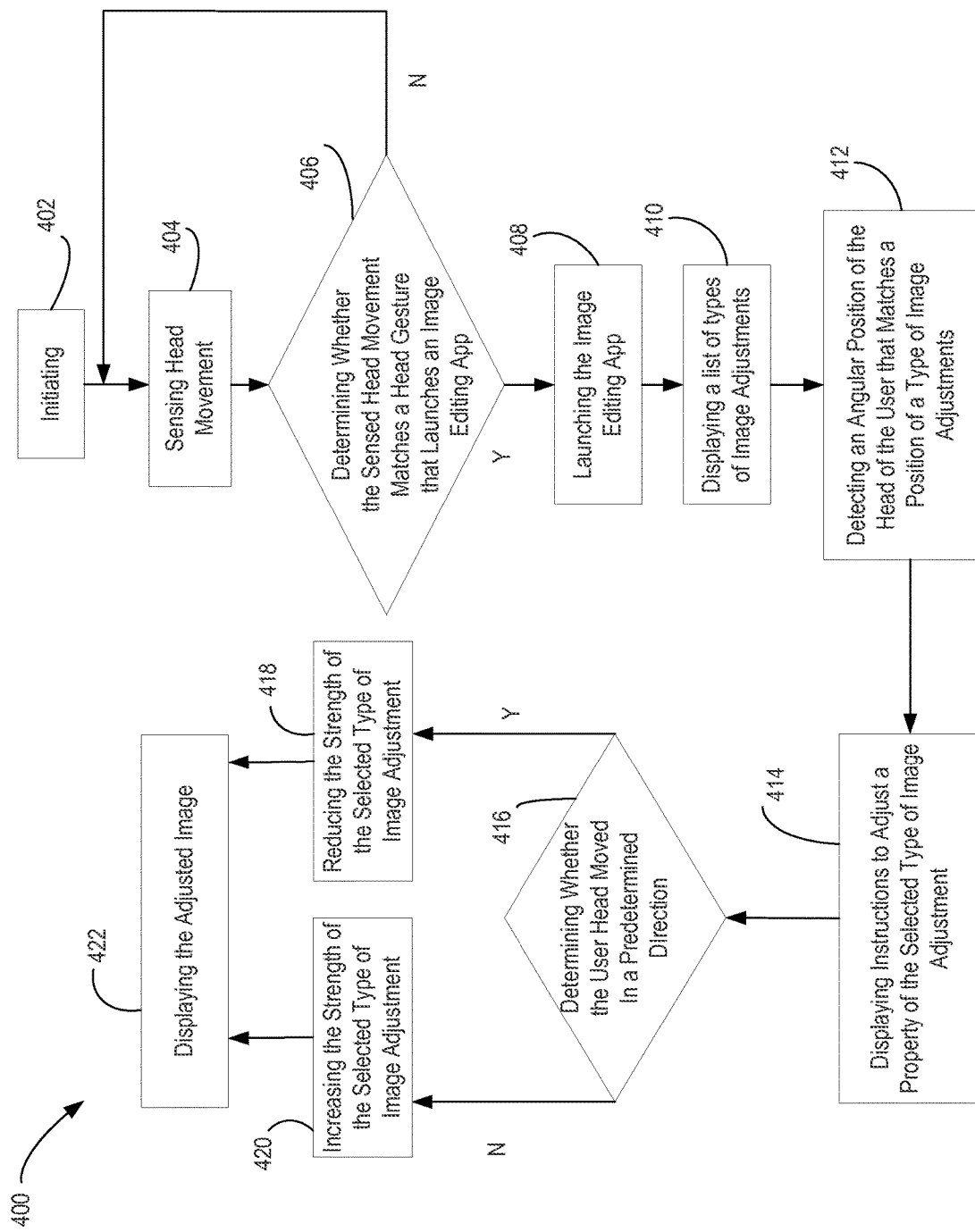
FIG. 4 illustrates an example process for image editing using head movement detected by the wearable display device of FIG. 1 according to certain aspects of the disclosure.

FIG. 4 illustrates an example process 400 for image editing using head movement detected by the wearable display device of FIG. 1 according to certain aspects of the disclosure. The process 400 may be performed using, for example, the wearable display device 100 of FIG. 1, particularly, the processor unit 202 of FIG. 2. While FIG. 4 is described with reference to FIG. 2, it should be noted that the process blocks of FIG. 4 may be performed by other systems. FIG. 4 illustrates the blocks in the example process 400 initiated at Block 402, however, it is understood that in other implementations of the example process 400, the blocks may appear in different order and blocks may be added or subtracted.

Once a user triggers a display of an image on the display unit of the wearable display device 100, the processor unit 202 activates a gyroscope (e.g., the motion sensor device 136) and an accelerometer (e.g., the motion sensor device 134). Upon authorization by the user, the processing of any captured image data may be initiated and performed by the processor unit 302.

Upon detection of head movement data by the gyroscope and/or the accelerometer (404), motion and orientation application 210 determines whether the sensed head movement data includes an identifiable head gesture that triggers an editing process of the displayed image by comparing a stored triggering head gesture to the identifiable head gesture found in the sensed data (406). Once the processor unit 202 determines that the captured head gesture matches or nearly matches the stored triggering head gesture, the processor unit 202 triggers a launching of the image editing application 220 (408).

Subsequently, the processor unit 202 provides for display on the display unit a menu list that includes a number of types of image adjustments (410). The processor unit 202 may also instruct the user to raise or lower his or her head at an angle that correspond to the listing position of a desirable type of adjustment with respect to a horizontal reference, for example, determined by the gyroscope. Upon detection of an angular position of the user's head, via the gyroscope, that matches that of the desirable type of adjustment (412), the processor unit 202 instructs the user to move his or her head to the left or to the right so as to reduce or increase, respectively, a strength (or intensity) of the selected type of image adjustment (414). In some aspects, the image data includes a sequence of head movements such that the amount of change from the start of the sequence to the end of the sequence translates into a sequence of image adjustments at rate of change corresponding substantially to a rate of change of the head movements. For example, if the sequence of head movements indicates that the user's head is moving at a relatively low rate, then the sequence of image adjustments may transition between the levels of adjustment at a relatively low rate as well.

Upon determination of a movement of the head to the left, via the accelerometer (416), the image editing application 220 reduces the strength of the selected type of adjustment (418). Otherwise, the image editing application 220 increases the strength of the selected type of adjustment (420). Upon completion of the image editing operation, the processor unit 202 stores the modified image in the image and gestures library 221, and terminates activity of the image editing application 220. Alternatively, the processor unit 202 provides for transmission the modified image to an external repository (e.g., a cloud-based database) for storage of the modified image. In some aspects, the processor unit 202 provides for display the modified image on a display unit (e.g., the display units 112, 122) during the image adjustments in real-time, or after the image has been modified (422).

Figure 5:
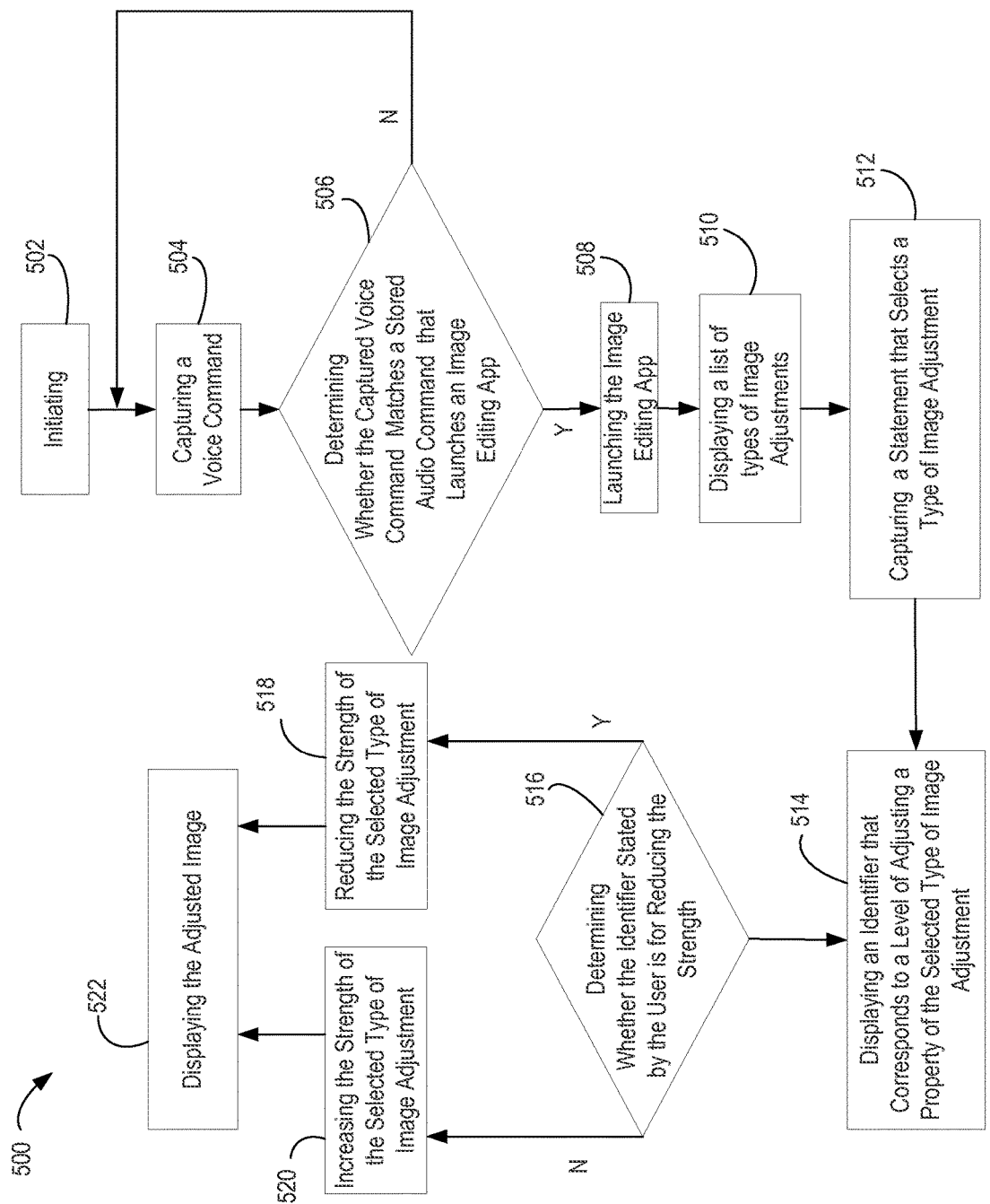
FIG. 5 illustrates an example process for image editing using audible commands detected by the wearable display device of FIG. 1 according to certain aspects of the disclosure.

FIG. 5 illustrates an example process 500 for image editing using audible commands detected by the wearable display device of FIG. 1 according to certain aspects of the disclosure. The process 500 may be performed using, for example, the wearable display device 100 of FIG. 1, particularly, the processor unit 202 of FIG. 2. While FIG. 5 is described with reference to FIG. 2, it should be noted that the process blocks of FIG. 5 may be performed by other systems. FIG. 5 illustrates the blocks in the example process 500 initiated at Block 502, however, it is understood that in other implementations of the example process 500, the blocks may appear in different order and blocks may be added or subtracted.

Once a user triggers a display of an image on the display unit of the wearable display device 100, the processor unit 202 activates audio sensing data application 214. Upon authorization by the user, the processing of any captured audio data may be initiated and performed by the processor unit 302.

Upon detection of a voice command or audio command via the microphone device 142 (504), the audio sensing data application 214 determines whether the detected audio data includes an identifiable command that triggers an editing process of the displayed image by comparing a stored triggering audio command to the identifiable audio command in the detected audio data (506). Once the processor unit 202 determines that the identifiable audio command matches or nearly matches the stored triggering audio command, the processor unit 202 triggers a launching of the image editing application 220 (508). In some aspects, the stored triggering audio command is associated with a user profile which includes user information such as account information and/or access privileges to the wearable display device 100. For example, the user profile may include a waveform profile that represents the stored triggering audio command as a multi-dimensional audio signal including magnitude, frequency and time as dimensions. In this respect, the wearable display device 100 may support multi-user access by accessing user profiles locally stored on the memory unit 206 or accessible from an external repository via the communication unit 204.

Subsequently, the processor unit 202 provides for display on the display unit a menu list that includes a number of types of image adjustments, each of which may be associated with a number, for example (510). The types of image adjustments may be associated with other types of statements representing an action to change an adjustment level, such as "up," "down," "more," "less," "higher," "lower," or the like. In some aspects, the statements may include a statement identifying an amount of change relative to a current level of an image property (e.g., "increase saturation by two"). The processor unit 202 may also instruct the user to state the name of the desirable type of adjustment or state the associated number. Upon detection of a statement by the user, by the processor unit 202 via the audio sensing data application 214, that matches the name of the desirable type of adjustment or of the associated number (512), the processor unit 202 instructs the user to state a numerical value in a range of 1 to 5, in some embodiments, or in a range of 6 to 10, in other embodiments, so as to reduce or increase, respectively, a strength of the selected type of adjustment (514).

In some aspects, the processor unit 202 via the audio sensing data application 214 may compare the identifiable audio command against a predetermined threshold value that represents a magnitude (or volume) and/or a frequency value corresponding to a particular pitch of the stored triggering audio command. For example, if the processor unit 202 determines that the volume of the identifiable audio command satisfies the predetermined threshold (e.g., being greater than the threshold), then the processor unit 202 may determine a match. Alternatively, the processor unit 202 may determine a match if the pitch of the identifiable audio command is within the acceptable pitch frequency range (e.g., being smaller than the predetermined threshold where the predetermined threshold represents a maximum frequency).

Upon determination of a statement of one of the numerical values in the range of 1 to 5, via the microphone device 142 (516), the image editing application 220 reduces the strength of the selected type of adjustment to the corresponding stated value (518). Otherwise, the image editing application 220 increases the strength of the selected type of adjustment to the corresponding stated value (520). For example, the strength of the selected type of adjustment may increase to a level of adjustment in the range of 6 to 10. In some aspects, the pitch of the identifiable audio command is used to determine the direction of the strength adjustment in the image adjustment type. For example, if the identifiable audio command is determined to have a relatively high pitch (e.g., greater than 100 Hertz), then the processor unit 202 increases the strength of the selected type of image adjustment. In addition, the magnitude (or volume) detected in the relatively high pitch may further adjust the strength in the increasing direction. For example, the strength of the selected type of image adjustment may be increased incrementally if the relatively high-pitched audio command becomes progressively louder. On the other hand, if the identifiable audio command is determined to have a relatively low pitch (e.g., less than 100 Hertz), then the processor unit 202 decreases the strength of the selected type of image adjustment. In this example, the processor unit 202 may decrease the strength decrementally if the relatively low-pitched audio command becomes progressively louder.

Upon completion of the image editing operation, the processor unit 202 stores the modified image in the image and gestures library 221, and terminates activity of the image editing application 220. Alternatively, the processor unit 202 provides for transmission the modified image to an external repository (e.g., a cloud-based database) for storage of the modified image. In some aspects, the processor unit 202 provides for display the modified image on a display unit (e.g., the display units 112, 122) during the image adjustments in real-time, or after the image has been modified (522).

In accordance with the present disclosure, editing images on the wearable display device 100 can be performed by one or more hand gestures, by one or more head gestures, by audible voice commands, and by one or more eye movements. Accordingly, the wearable display device 100 is equipped with one or more cameras that can record hand gestures, with one or more gyroscopes/accelerometers that sense head gestures and/or head movements, with one or more voice capture units that detect voice commands, and with one or more eye gazing cameras that capture images of eye movements by the person wearing the wearable display device 100, thereby enhancing the user experience of editing images via the wearable display device 100.

In an embodiment, a computer-implemented method includes obtaining image information by a sensor unit of a wearable device, the image information including a moveable object associated with a user. The method includes executing an application for editing an image by a processing unit of the wearable device, the application being executed based on the image information. The method includes providing for display, on a display unit of the wearable device, a list of image adjustment types associated with the application. The method includes selecting at least one image adjustment type of the list of image adjustment types based on a first position of the moveable object. The method includes providing for display, on the display unit, a prompt including levels of adjustment for the selected at least one image adjustment type. The method includes selecting a level of adjustment based on a second position of the moveable object. The method includes modifying an image using the selected level of adjustment. The method further includes providing the modified image for storage by a memory unit of the wearable device.

In another embodiment, a non-transitory machine-readable medium embodying instructions, which when executed by one or more processors, cause a computing device to perform operations. The operations include receiving, at a processor unit of a wearable device, first audio data from a sensor unit of the wearable device, in which the first audio data is associated with a user. The operations include providing for display, on a display unit of the wearable device, a user interface of an application for editing an image based on a first user input in the first audio data. The operations include providing for display, on the display unit via the user interface, a list of image adjustment types. The operations include selecting at least one image adjustment type of the list of adjustment types based on a second user input via the user interface. The operations include providing for display, on the display unit via the user interface, a prompt including levels of adjustment for the selected at least one image adjustment type, in which each of the levels of adjustment is displayed with a label corresponding to a level of adjustment. The operations include selecting a level of adjustment based on a third user input via the user interface. The operations include modifying an image based on the selected level of adjustment. The operations further include providing the modified image for storage by a memory unit of the wearable device.

In still another embodiment, an apparatus includes a display unit, one or more sensor units, one or more memory units and one or more processing units configured to execute executable instructions to perform operations. The operations include receiving, at the one or more processor units, first sensor data from the one or more sensor units, the first sensor data comprising first image information relating to a moveable object associated with a user. The operations include identifying one or more first movements by the moveable object included in the first image information, in which the one or more first movements include one or more of a head movement by the user, a hand movement by the user or a gaze direction by the user. The operations include determining that the one or more first movements correspond to a first gesture associated with a first user input. The operations include providing for display, on the display unit, a user interface of an application for editing an image based on the first user input. The operations include providing for display, on the display unit via the user interface, a list of image adjustment types. The operations include determining a position of the first gesture relative to the list of image adjustment types. The operations include determining a match between a position of at least one image adjustment type of the list of adjustment types and the determined position of the first gesture. The operations include selecting the at least one image adjustment type based on the determined match. The operations include providing for display, on the display unit via the user interface, a prompt including a plurality of levels of adjustment for the selected at least one image adjustment type. The operations include receiving, at the one or more processor units, second sensor data from the one or more sensor units in response to the prompt provided for display, in which the second sensor data includes second image information relating to the moveable object. The operations include determining one or more second movements by the moveable object included in the second image information, in which the one or more second movements include one or more of the head movement or the hand movement by the user. The operations include determining that the one or more second movements correspond to a second gesture associated with a second user input. The operations include selecting a level of adjustment for the selected at least one image adjustment type based on the second user input. The operations include modifying an image based on the selected level of adjustment. The operations further include providing the modified image for storage in a data structure of the one or more memory units.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The following claims are hereby incorporated into the Detailed Description, with each claim standing on its own as a separately claimed subject matter. In one aspect, any of the claims herein may be revised to depend from any one of the independent claims or any one of the dependent claims. In one aspect, any of the claims (e.g., dependent or independent claims) may be revised to be combined with any other one or more claims (e.g., dependent or independent claims). In one aspect, a claim may be revised to include some or all of the words (e.g., steps, operations, means or components) recited in a claim, a sentence, a phrase or a paragraph. In one aspect, a claim may be revised to include some or all of the words recited in one or more claims, sentences, phrases or paragraphs. In one aspect, some of the words in each of the claims, sentences, phrases or paragraphs may be removed. In one aspect, additional words or elements may be added to a claim, a sentence, a phrase or a paragraph. In one aspect, the subject technology may be implemented without utilizing some of the components, elements, functions or operations described herein. In one aspect, the subject technology may be implemented utilizing additional components, elements, functions or operations.

Methods and operations described in the specification or the claims can be implemented, for example, using a non-transitory machine-readable medium, a system or a computer-implemented method. A non-transitory machine-readable medium may embody instructions, where the instructions are executable by one or more processors to perform the method(s) or operation(s). A system may comprise one or more memories and one or more processors configured to execute executable instructions to perform the method(s) or operation(s). A machine-implemented method may comprise the method(s) or operation(s).

What is claimed is:

1. A computer-implemented method, comprising:
receiving, at a processor unit of a wearable device, first audio data from a sensor unit of the wearable device, the first audio data being associated with a first audio command of a user;
providing for display, on a display unit of the wearable device via a user interface, a list of image adjustment types associated with an application for editing an image based on the first audio data, by a processing unit of the wearable device;
selecting at least one image adjustment type of the list of image adjustment types based on second audio data from the sensor unit, the second audio data being associated with a second audio command of the user;
providing for display, on the display unit, a prompt including a plurality of levels of adjustment for the selected image adjustment type;
selecting a level of adjustment from the plurality of levels of adjustment based on third audio data from the sensor unit, the third audio data being associated with a third audio command of the user;
selecting a region of the image by selecting coordinates or a quadrant of the image for applying the selected at least one image adjustment type with the selected level of adjustment, based on a fourth audio command of the user; and
providing a modified image with the region modified by the selected at least one image adjustment type with the selected level of adjustment, for display on the display unit.

2. The computer-implemented method of claim 1, wherein the selected level of adjustment includes an action to increase or decrease a strength of the selected at least one image adjustment type.

3. The computer-implemented method of claim 1, further comprising:
modifying the region of the image using the level of adjustment for the selected image adjustment type.

4. The computer-implemented method of claim 1, wherein at least one of the first audio command, the second audio command, or the third audio command includes a word, phrase or statement.

5. The computer-implemented method of claim 1, further comprising:
determining that the first audio data includes a first voice command associated with the first audio command of the user; and
determining a match between the first voice command and a first predetermined voice command.

6. The computer-implemented method of claim 1, determining that the second audio data include a second voice command associated with the second audio command of the user; and
determining a match between the second voice command and a second predetermined voice command.

7. The computer-implemented method of claim 1, wherein the third audio data includes data representing a frequency value of at least a portion of the third audio command and wherein selecting the level of adjustment is based, at least in part, on the data representing the frequency value of the at least a portion of the third audio command.

8. The method of claim 1, wherein the third audio data includes data representing volume of at least a portion of the third audio command and wherein selecting the level of adjustment is based, at least in part, on the data representing the volume of the at least a portion of the third audio command.

9. A non-transitory machine-readable medium with instructions stored thereon, which when executed by one or more processors, cause the one or more processors to perform operations, the operations comprising:
receiving, at a processor unit of a wearable device, first audio data from a sensor unit of the wearable device, the first audio data being associated with a first audio command of a user;
providing for display, on a display unit of the wearable device, a user interface of an application for editing an image based on the first audio data;
providing for display on the display unit via the user interface, a list of image adjustment types;
selecting at least one image adjustment type of the list of adjustment types based on second audio data from the sensor unit, the second audio data being associated with a second audio command of the user;
providing for display, on the display unit via the user interface, a prompt including a plurality of levels of adjustment for the selected at least one image adjustment type;
selecting a level of adjustment from the plurality of levels of adjustment based on third audio data from the sensor unit, the third audio data being associated with a third audio command of the user;
selecting a region of the image by selecting coordinates or a quadrant of the image for applying the selected at least one image adjustment type with the selected level of adjustment, based on a fourth audio command of the user; and
providing a modified image with the region modified by the selected at least one image adjustment type with the selected level of adjustment, for display on the display unit.

10. The non-transitory machine-readable medium of claim 9, wherein the operations further comprise modifying the region of the image based on the level of adjustment, wherein the level of adjustment includes an increase or decrease of a strength of the selected at least one image adjustment type.

11. The non-transitory machine-readable medium of claim 9, wherein the operations further comprise:
determining that at least a portion of the first audio data includes a first voice command; and
determining a match between the first voice command and a first predetermined voice command associated with the first user command.

12. The non-transitory machine-readable medium of claim 9, wherein the operations comprise:
receiving, at the one or more processors, the second audio data from the sensor unit in response to the prompt provided for display;
determining that at least a portion of the second audio data includes a second voice command; and
determining a match between the second voice command and a second predetermined voice command associated with the second audio command.

13. The non-transitory machine-readable medium of claim 9, wherein the operations comprise:
receiving, at the one or more processors, the third audio data from the sensor unit in response to the prompt provided for display;
determining that at least a portion of the third audio data includes a third voice command; and
determining a match between the third voice command and a third predetermined voice command associated with the third audio command.

14. The non-transitory machine-readable medium of claim 9, wherein the providing for display the list of image adjustment types comprises:
outputting, via an output unit of the wearable device, an audible signal which audibly identifies the list of image adjustment types, the audible signal being output concurrently with the display of the list of image adjustment types.

* * * * *